Figure 1:
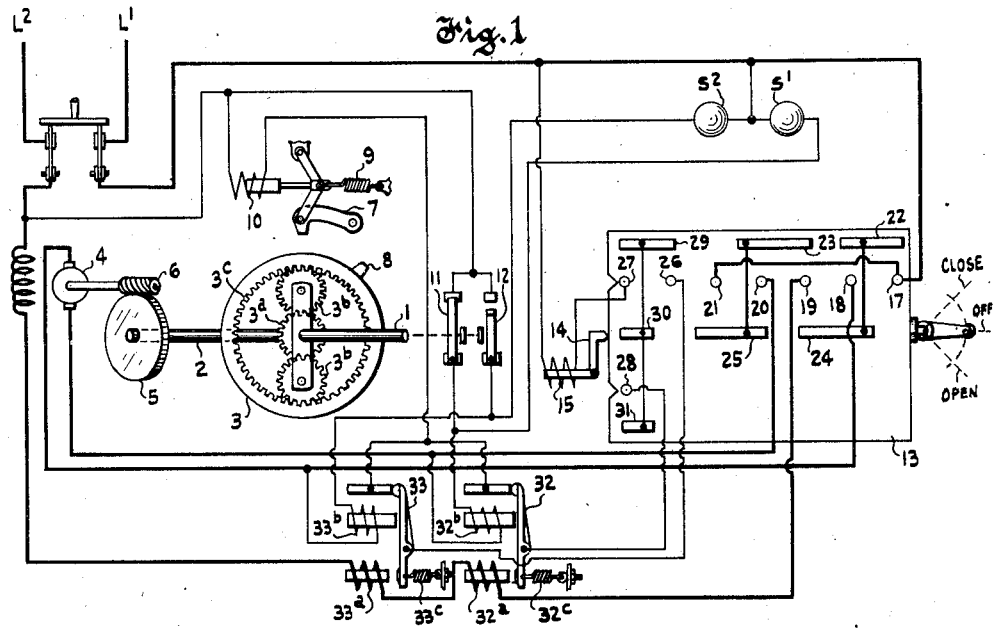

March 14, 1933.  C. W. KUHN  1,901,397

DRIVING MECHANISM FOR VALVES AND OTHER DEVICES

Filed June 13, 1928   2 Sheets-Sheet 1

INVENTOR
Clarence W. Kuhn.
BY
Frank H. Hubbard
ATTORNEY

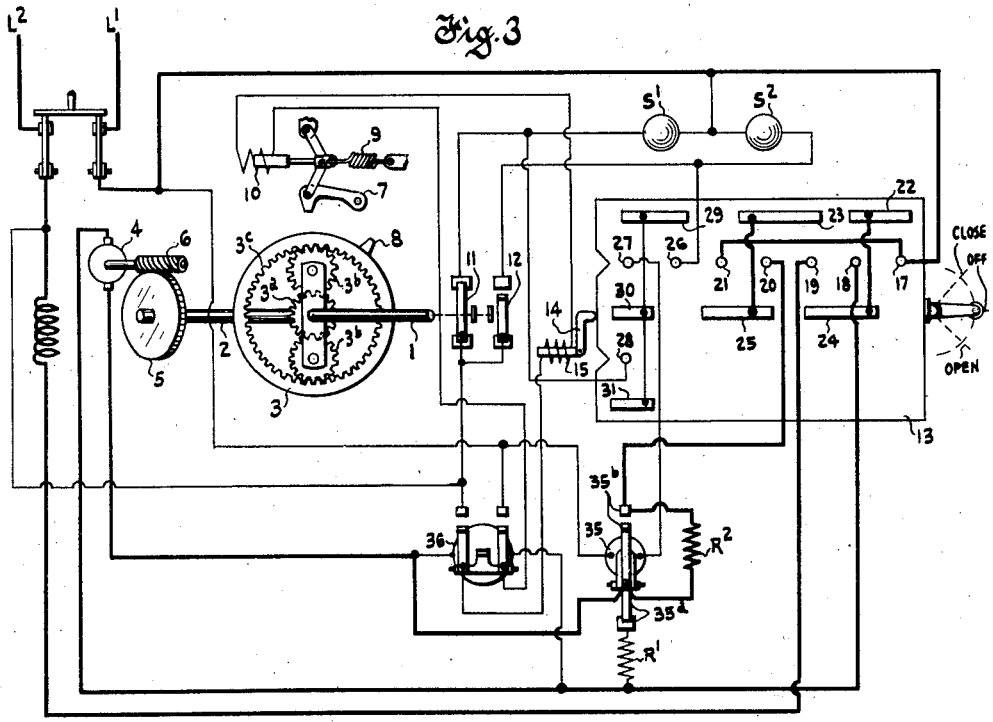
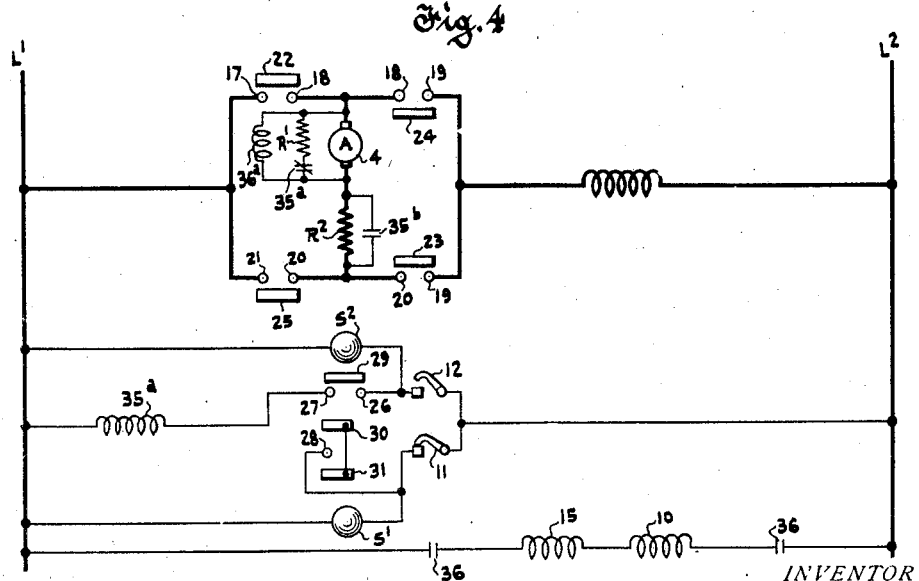

Patented Mar. 14, 1933

1,901,397

UNITED STATES PATENT OFFICE

CLARENCE W. KUHN, OF NORTH MILWAUKEE, WISCONSIN, ASSIGNOR, BY MESNE ASSIGNMENTS, TO CUTLER-HAMMER, INC., OF MILWAUKEE, WISCONSIN, A CORPORATION OF DELAWARE

DRIVING MECHANISM FOR VALVES AND OTHER DEVICES

Application filed June 13, 1928. Serial No. 285,111.

This invention relates to driving mechanisms for valves and other devices.

The patent to Peter P. Dean, No. 1,295,445, of February 25, 1919, discloses a motor driven valve operating mechanism including a normally restrained member which is releasable to effect substantially instantaneous interruption of the driving connection between the motor and the valve. The control means for said normally restrained member includes an overload relay connected in the motor circuit and adapted to respond upon arrest of the valve in its limits to release said normally restrained member and thereby prevent excessive jamming of the valve. In practice it has been found that if the overload relay is calibrated to respond at a load which prevents excessive jamming of the valve in its limits the same is also likely to respond if the frictional or other resistance of the valve increases above normal at points between limits.

The present invention has among its objects to provide improved control means for valve operating mechanisms of the above mentioned character which insures against interruption of the driving connections during movement of the valve between limits and which acts during seating of the valve, and if desired upon opening thereof, to effect substantially instantaneous interruption of the driving connections when the load on the motor exceeds a predetermined value.

Another object is to provide a control system of the aforesaid character which is capable of adjustment to limit the operating torque applied to the valve to different predetermined values during final movement of the valve into its limits.

Another object of the invention is to provide a control system for valve operating mechanisms of the aforesaid character which provides for slowdown of the motor prior to movement of the valve into open and closed positions.

Various other objects and advantages of the invention will hereinafter appear.

The accompanying drawings illustrate certain embodiments of the invention which will now be described, it being understood that the embodiments illustrated may be modified without departing from the spirit and scope of the appended claims.

Figure 2:
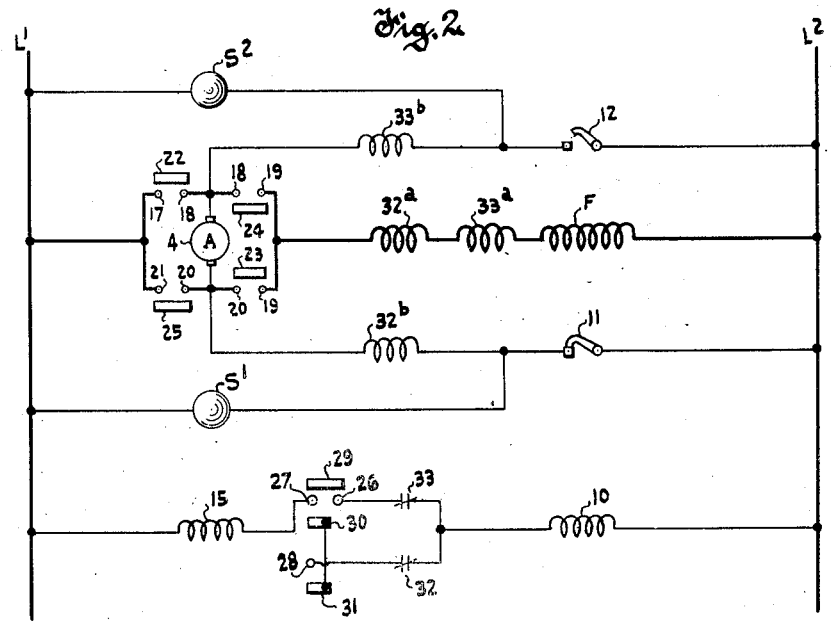

In the drawings,

Figure 1 is a schematic and diagrammatic view of a control system embodying the invention, Fig. 2 is an across-the-line diagram of the circuit connections shown in Fig. 1, Fig. 3 is a schematic and diagrammatic view of a modified form of control system embodying the invention, and Fig. 4 is an across-the-line diagram of the circuit connections shown in Fig. 3.

Referring to Fig. 1, the same schematically illustrates a valve operating mechanism of the character disclosed in the copending application of Peter P. Dean, Serial No. 697,535, filed March 7, 1924. Such mechanism comprises a driven shaft 1, a driving shaft 2, a planetary speed reducing gear 3 for establishing a driving connection between said shafts, and a motor 4 operatively connected to the driving member 2 through the medium of a worm wheel 5 and a worm 6. The planetary gear 3 includes a pinion $3^a$ fixed to the driving shaft 2, a plurality of pinions $3^b$ carried by projecting arms on the driven shaft 1, and an internally toothed ring gear $3^c$, the pinions $3^b$ being arranged between and in mesh with the pinion $3^a$ and the ring gear $3^c$. The ring gear $3^c$ is revolubly mounted, and as is apparent restraint of said ring gear renders the planetary gear effective as a driving connection between the driving shaft 1 and driven shaft 2, whereas release of said ring gear permits rotation thereof for release of said driving member from said driven shaft.

The means employed for restraining the ring gear $3^c$ includes a pivoted latch 7 adapted to cooperate with a stop 8 fixed to ring gear $3^c$. Latch 7 is provided with an operating toggle which is biased by a spring 9 to move said latch out of engagement with the stop 8. The toggle is adapted to be moved against the action of spring 9 by an operating magnet 10 to move latch 7 into the path of the stop 8 on ring gear $3^c$.

The valve operating mechanism is further provided with a pair of limit switches 11 and 12 which are driven from the driven shaft 1 through the medium of a speed reducing gearing which may be of the character disclosed in the aforementioned copending application of Peter P. Dean. As hereinafter set forth, these limit switches act to control a pair of relays and one of said limit switches is adapted to open just prior to seating of the valve, while the other is adapted to open just prior to closure of the valve.

The motor 4 is shown as being of the series type and the control means therefor comprises a master drum 13 having an intermediate off position and extreme on positions. Said controller is biased towards off position by suitable means not shown and the same is adapted to be held in its extreme on positions by a latch 14 having an associated operating winding 15. Drum 13 is provided with stationary contacts 17 to 21, inclusive, and cooperating movable contacts 22 to 25, inclusive, which contacts serve as hereinafter set forth to establish reverse power connections for the motor 4. In addition to the aforementioned contacts drum 13 is provided with stationary contacts 26, 27 and 28 and cooperating movable contacts 29, 30 and 31, which serve as hereinafter set forth to control the operating windings 10 and 15 of latches 7 and 14 through the medium of a pair of relays 32 and 33.

Relays 32 and 33 are each provided with an operating winding designated by reference character "$a$", and a restraining winding designated by reference character "$b$", and each of said relays is held in closed position by an adjustable spring "$c$". For purposes hereinafter set forth, the operating windings $32^a$ and $33^a$ are arranged to be connected in series with the motor upon establishment of the power connections therefor. The restraining winding $32^b$ of relay 32 is adapted to be energized through the medium of limit switch 11 upon establishment of power connections for operation of motor 4 in one direction and the restraining winding $33^b$ of relay 33 is adapted to be energized through the medium of limit switch 12 upon establishment of power connections for operation of motor 4 in a reverse direction.

The function and operation of the aforedescribed controller together with the circuit connections therefor will now be more fully described in connection with Fig. 2. Assuming that the valve is in open position, closure thereof is effected by moving the master drum 13 upwardly from the position shown in Fig. 1. With the master switch 13 in its up position motor 4 is energized by a circuit extending from line $L^1$ through contacts 21, 25 and 20 of said drum through the armature A of said motor through contacts 18, 24 and 19 of said drum and thence through windings $32^a$ and $33^a$ of relays 32 and 33 and the field F of the motor to line $L^2$. Also, immediately upon establishment of the aforedescribed energizing circuit for the motor the latch windings 10 and 15 are energized by a circuit extending from line $L^1$ through the winding 15 through contacts 27, 30, 31 and 28 of the master drum, through relay 32 and through the winding 10 to line $L^2$. Energization of winding 15 moves the latch 14 into locking position to hold the master switch 13 in valve closing position while energization of winding 10 moves the latch 7 into the path of the stop 8 on ring gear $3^c$. Latch 7 thus effects arrest of the ring gear $3^c$ to establish a driving connection between the driven shaft 1 and driving shaft 2 and in this connection it should be noted that arrest of said ring gear by said latch effects initiation of the operation of the valve with a hammer blow.

During closing movement of the valve the restraining winding $32^b$ of relay 32 is energized by a circuit extending from line $L^1$ through contacts 21, 25 and 20 of the master drum to and through said winding and through the limit switch 11 to line $L^2$. Winding $32^b$ thus prevents response of relay 32 under the action of the winding $32^a$. However, just prior to seating of the valve, limit switch 11 opens to interrupt the aforedescribed energizing circuit for restraining winding $32^b$ and the relay 32 is then held in closed position against the action of winding $32^a$ by the spring $32^c$. Upon arrest of the valve in closed position motor 4 tends to stall and the current in the motor circuit thus rises above normal value. Upon a given reduction in the speed of the motor the current in the motor circuit rises to a value which causes the winding $32^a$ to effect opening of relay 32 against the action of spring $33^c$. Opening of said relay interrupts the aforedescribed energizing circuit for the latch windings 10 and 15. Latch 7 is then released under the action of spring 9 to interrupt the driving connection between driven shaft 1 and driving shaft 2 while latch 14 is released to permit return of the master drum 13 to off position.

The valve being in closed position opening thereof is effected by moving the master drum 13 downwardly from the position shown in Fig. 1. With the master drum in its down position motor 4 is energized by a circuit extending from line $L^1$ through contacts 17, 22 and 18 of said drum to and through the armature A of said motor through contacts 20, 23 and 19 of said drum and thence through the operating windings $32^a$ and $33^a$ of the relays 32 and 33 and the field F of the motor to line $L^2$. Also, upon establishment of such power connections for the motor the latch operating windings 10 and 15 are energized by a circuit extending from line L¹ through the winding 15 through contacts 27, 29 and 26 of the master drum 13 to and through the relay 33 and through the winding 10 to line L². Energization of winding 15 operates the latch 14 to restrain the master switch 13 in its valve closing position while energization of winding 10 moves the latch 7 into the path of the stop 8 on ring gear 3ᵉ to establish the driving connection between the driven shaft 1 and driving shaft 2. During opening movement of the valve relay 33 is held in closed position against the action of its operating winding 33ᵃ by the winding 33ᵇ which is energized by a circuit extending from line L¹ through contacts 17, 22 and 18 of the master drum 13 to and through said restraining winding and through limit switch 12 to line L². However, just prior to movement of the valve into its open position limit switch 12 is opened to interrupt the energizing circuit for winding 33ᵇ of relay 33 and said relay is then held in closed position against the action of winding 33ᵃ by its spring 33ᶜ. When the valve is arrested in open position motor 4 tends to stall and the current in the motor circuit rises to a value which causes the winding 32ᵃ to effect opening of relay 32 against the action of spring 33ᶜ. Opening of relay 33 interrupts the aforedescribed energizing circuit for the latch operating windings 10 and 15 and the latch 14 is then released to permit return of the master drum to off position while the latch 7 is released under the action of spring 9 to release ring gear 3ᵉ for interruption of the driving connection between the driven shaft 1 and driving shaft 2.

Referring to Fig. 3, the valve operating mechanism and master drum shown therein are the same as shown in Fig. 1 and the parts thereof are designated by reference numerals corresponding to those used in Fig. 1. The control means shown in Fig. 3 provides for slowdown of the motor just prior to seating or opening of the valve and also provides for interruption of the driving connections for the motor and return of the master drum to off position when the motor tends to stall due to arrest of the valve in either open or closed positions.

The means for effecting slowdown of the motor comprises resistances R¹ and R², the former to be connected across the motor armature and the latter to be connected in series with the motor. Said resistances are controlled by a relay 35 which is controlled by the master drum 13 through the medium of the limit switches 11 and 12. Relay 35 is provided with normally closed down contacts 35ᵃ for controlling resistance R¹ and normally open up contacts 35ᵇ for controlling resistance R². The windings 10 and 15 associated with latches 14 and 7 are controlled by a normally open double pole relay 36 having an operating winding 36ᵃ permanently connected across the armature of motor 4.

Referring now to Fig. 4, it will be observed that the master drum 13 serves to selectively establish reverse power connections for motor 4 as in Fig. 1. Assuming that the valve is in open position and that the master drum 13 is moved to its valve closing position, immediately upon establishment of the power connections for motor 4 relay 35 is energized by a circuit extending from line L¹ through the operating winding 35ᵃ of said relay through contacts 27, 30, 28 and 31 of the master drum 13 to and through the limit switch 11 to line L². Relay 35 in responding excludes resistances R¹ and R² from the motor circuit. As soon as the speed of the motor increases above a given value the winding 36ᵃ effects response of relay 36 and said relay in responding connects the latch operating windings 10 and 15 across lines L¹—L². Energization of winding 10 effects response of latch 7 for establishment of the driving connections between the motor and the valve and energization of winding 15 causes the latch 14 to hold the master drum 13 in its valve closing position.

Just prior to seating of the valve limit switch 11 opens to interrupt the aforedescribed energizing circuit for relay 35, and said relay returns to normal position to include resistances R¹ and R² in the motor circuit for slowdown of the motor. Upon seating of the valve, motor 4 tends to stall and upon a given reduction in the speed of the motor winding 36ᵃ permits relay 36 to open for interruption of the energizing circuit of the latch operating windings 10 and 15. Deenergization of winding 10 permits tripping of latch 7 for interruption of the driving connection while deenergization of winding 15 permits tripping of latch 14 for return of the master drum 13 to off position.

For opening of the valve the operation of the controller is similar to that above described. When the master drum 13 is moved to valve closing position the winding 35ᵃ of relay 35 is energized through the medium of contacts 27, 29 and 26 of the master drum and limit switch 12. Just prior to opening of the valve limit switch 12 opens to interrupt the energizing circuit for relay 35 to provide for slowdown of the motor and when the motor tends to stall the relay 36 acts as hereinbefore described to interrupt the driving connections and permit return of the master drum to off position.

The controllers shown in Figs. 1 and 3 are both provided with signal lamps S¹ and S² which are arranged to be connected across lines $L^1$—$L^2$ by limit switches 11 and 12, respectively. Lamp $S^1$ is thus deenergized by limit switch 11 upon closure of the valve while lamps $S^2$ is deenergized by limit switch 12 upon opening of the valve.

What I claim as new and desire to secure by Letters Patent is:

1. The combination with a part to be driven into a definite limit, a driving motor therefor, a quickly interruptible driving connection therebetween, a relay responsive to interrupt said driving connection, said relay having an operating winding connected in circuit with said motor to effect response thereof under given current conditions, and having a restraining winding to prevent response thereof under the action of said former winding, and means for controlling said restraining winding to prevent response of said relay except during final movement of said part into said limit.

2. The combination with a part to be driven into a definite limit, of a driving motor therefor, a line switch mechanism for connecting said motor to a source of supply and having electromagnetically operated means associated therewith for holding the same in closed position, a quickly interruptible driving connection between said motor and said driven part including a member to be respectively restrained and released to render said connection effective and ineffective, an electromagnetic device responsive upon establishment of line connections for said motor to restrain said member, a relay responsive to render the holding means associated with said line switch mechanism and said restraining device ineffective under given current conditions in the motor circuit, and means associated with said relay to prevent response thereof except during final movement of said part into said definite limit.

In witness whereof, I have hereunto subscribed my name.

CLARENCE W. KUHN.